US011604374B2

(12) United States Patent
Azuma et al.

(10) Patent No.: US 11,604,374 B2
(45) Date of Patent: Mar. 14, 2023

(54) DISPLAY APPARATUS

(71) Applicant: Saturn Licensing LLC, New York, NY (US)

(72) Inventors: Yohei Azuma, Tokyo (JP); Takeshi Yamamoto, Tokyo (JP); Soya Araki, Kanagawa (JP); Yoshinori Tachikawa, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/956,133

(22) PCT Filed: Oct. 22, 2018

(86) PCT No.: PCT/JP2018/039164
§ 371 (c)(1),
(2) Date: Jun. 19, 2020

(87) PCT Pub. No.: WO2019/130756
PCT Pub. Date: Jul. 4, 2019

(65) Prior Publication Data
US 2020/0326582 A1 Oct. 15, 2020

(30) Foreign Application Priority Data
Dec. 26, 2017 (JP) .............................. JP2017-249008

(51) Int. Cl.
*G06F 1/16* (2006.01)
*G02F 1/1333* (2006.01)
*H05K 5/00* (2006.01)

(52) U.S. Cl.
CPC ...... *G02F 1/133308* (2013.01); *G06F 1/1601* (2013.01); *G06F 1/1613* (2013.01);
(Continued)

(58) Field of Classification Search
CPC ................ G06F 1/1613; G06F 1/1656; G06F 2200/1612; G02F 1/133308; G02F 1/133317
See application file for complete search history.

(56) References Cited

U.S. PATENT DOCUMENTS 5,046,739 A * 9/1991 Reichow ................. G06F 3/039
273/148 B
5,394,306 A * 2/1995 Koenck .................... H02B 1/48
174/544

(Continued)

FOREIGN PATENT DOCUMENTS

CN 101382675 A 3/2009
CN 102269887 A 12/2011
(Continued)

OTHER PUBLICATIONS

International Search Report from Application No. PCT/JP2018/039164 dated Dec. 18, 2018, 4 pages.

*Primary Examiner* — Adrian S Wilson
(74) *Attorney, Agent, or Firm* — Richard Laperuta

(57) ABSTRACT

Improvement of quality and improvement of a design property is achieved.
A display (2) that displays an image on a display surface (2a), a back chassis (3) disposed on a side, of the display (2), opposite to the display surface (2a), a sealing body (5) disposed between the display (2) and the back chassis (3), and an outer frame (6) that is provided as a resin portion (13) at least partly including a resin material, and covers the display (2) and the back chassis (3) from an outer periphery side are included. An inner peripheral surface of the resin portion (13) is brought into close contact with an outer peripheral surface of the display (2) and an outer peripheral surface of the back chassis (3).

20 Claims, 14 Drawing Sheets

(52) U.S. Cl.
CPC ......... *G06F 1/1656* (2013.01); *H05K 5/0017* (2013.01); *G02F 1/133317* (2021.01); *G06F 2200/1612* (2013.01)

(56) References Cited

U.S. PATENT DOCUMENTS

| | | | | |
|---|---|---|---|---|
| D356,547 S | * | 3/1995 | Silva | D14/341 |
| 5,613,223 A | * | 3/1997 | Ross | G06F 1/1626 |
| | | | | 455/575.1 |
| D413,582 S | * | 9/1999 | Tompkins | D14/344 |
| 6,028,765 A | * | 2/2000 | Swindler | B60R 11/0252 |
| | | | | 174/138 G |
| 6,560,092 B2 | * | 5/2003 | Itou | G06F 1/1626 |
| | | | | 108/43 |
| 6,781,825 B2 | * | 8/2004 | Shih | G06F 1/1616 |
| | | | | 312/223.1 |
| 6,815,070 B1 | * | 11/2004 | Burkle | C03C 17/32 |
| | | | | 428/425.6 |
| 6,885,314 B2 | * | 4/2005 | Levin | G06F 3/0213 |
| | | | | 341/20 |
| 7,106,580 B2 | * | 9/2006 | Kugimiya | G06F 1/1656 |
| | | | | 361/679.22 |
| D595,291 S | * | 6/2009 | Takemasa | D14/346 |
| D602,933 S | * | 10/2009 | Huang | D14/346 |
| 8,405,791 B2 | * | 3/2013 | Roh | G02F 1/133604 |
| | | | | 349/58 |
| 8,432,516 B2 | * | 4/2013 | Toyoda | G02F 1/1333 |
| | | | | 349/122 |
| 8,482,695 B2 | * | 7/2013 | Dunn | H05K 7/202 |
| | | | | 349/58 |
| 8,976,324 B2 | * | 3/2015 | Yang | G02B 6/0008 |
| | | | | 349/92 |
| 9,078,341 B2 | * | 7/2015 | Suzuki | H05B 33/02 |
| 9,119,293 B2 | * | 8/2015 | Mycroft | H05K 5/0086 |
| 9,235,240 B2 | * | 1/2016 | Pakula | G06F 3/041 |
| 9,285,533 B2 | * | 3/2016 | Moriwaki | G02F 1/133524 |
| 9,323,292 B2 | * | 4/2016 | Bae | H04M 1/18 |
| 9,423,638 B2 | * | 8/2016 | Shinya | C09J 109/00 |
| 9,550,335 B2 | * | 1/2017 | Cole | B29C 45/14311 |
| 9,641,658 B2 | * | 5/2017 | Kim | G02F 1/133308 |
| 9,743,536 B2 | * | 8/2017 | Maki | H04M 1/0266 |
| 10,372,166 B2 | * | 8/2019 | Gable | H01Q 1/243 |
| 10,717,582 B1 | * | 7/2020 | Goodenough | B65D 81/022 |
| 2003/0143961 A1 | * | 7/2003 | Humphreys | H04B 1/3888 |
| | | | | 455/575.8 |
| 2006/0268528 A1 | * | 11/2006 | Zadesky | H04M 1/0202 |
| | | | | 361/728 |
| 2007/0025072 A1 | * | 2/2007 | Liao | G06F 1/1637 |
| | | | | 361/679.21 |
| 2007/0064378 A1 | * | 3/2007 | Lo | G06F 1/1613 |
| | | | | 361/679.22 |
| 2007/0065091 A1 | * | 3/2007 | Hinata | G02F 1/133308 |
| | | | | 385/147 |
| 2007/0257410 A1 | * | 11/2007 | Toh | F16F 1/3605 |
| | | | | 267/153 |
| 2009/0141436 A1 | * | 6/2009 | Matsuoka | G06F 1/1656 |
| | | | | 361/679.09 |
| 2009/0219684 A1 | * | 9/2009 | Mori | G06F 1/1671 |
| | | | | 361/679.56 |
| 2010/0073594 A1 | * | 3/2010 | Miyazaki | G02F 1/133308 |
| | | | | 349/58 |
| 2010/0285260 A1 | * | 11/2010 | Bookbinder | B32B 17/10 |
| | | | | 428/45 |
| 2010/0326722 A1 | * | 12/2010 | Watazu | B32B 23/20 |
| | | | | 428/196 |
| 2011/0242686 A1 | * | 10/2011 | Watanabe | G02B 17/0884 |
| | | | | 359/804 |
| 2012/0055826 A1 | * | 3/2012 | Nishimura | B29C 45/14073 |
| | | | | 206/320 |
| 2013/0076649 A1 | * | 3/2013 | Myers | G06F 3/0485 |
| | | | | 345/173 |
| 2013/0081756 A1 | * | 4/2013 | Franklin | B29C 53/04 |
| | | | | 156/221 |
| 2013/0242483 A1 | * | 9/2013 | Hirasawa | H05K 5/0217 |
| | | | | 361/679.01 |
| 2013/0265715 A1 | * | 10/2013 | Bae | G06F 1/1656 |
| | | | | 361/679.55 |
| 2013/0300697 A1 | * | 11/2013 | Kim | G06F 3/0488 |
| | | | | 345/173 |
| 2013/0328462 A1 | * | 12/2013 | Pakula | H04M 1/0202 |
| | | | | 312/223.1 |
| 2014/0098472 A1 | * | 4/2014 | Zhang | H05K 5/02 |
| | | | | 361/679.01 |
| 2014/0176840 A1 | * | 6/2014 | Hashido | H05K 9/0054 |
| | | | | 349/33 |
| 2014/0240985 A1 | * | 8/2014 | Kim | H05K 1/028 |
| | | | | 362/249.04 |
| 2015/0055316 A1 | | 2/2015 | Ye et al. | |
| 2015/0093087 A1 | * | 4/2015 | Wu | G02B 6/10 |
| | | | | 385/132 |
| 2015/0198756 A1 | | 7/2015 | Song et al. | |
| 2015/0316811 A1 | * | 11/2015 | Uematsu | G02F 1/133524 |
| | | | | 349/58 |
| 2016/0147253 A1 | * | 5/2016 | Abbatiello | G06F 1/16 |
| | | | | 267/141 |
| 2016/0150656 A1 | * | 5/2016 | Maki | H04M 1/0266 |
| | | | | 361/679.01 |
| 2016/0295176 A1 | * | 10/2016 | Jeong | G09F 9/301 |
| 2017/0142239 A1 | * | 5/2017 | Bae | G06F 1/1635 |
| 2017/0192596 A1 | * | 7/2017 | Lee | G06F 3/04166 |
| 2017/0285690 A1 | * | 10/2017 | Aubin | G06F 1/1601 |
| 2017/0371204 A1 | | 12/2017 | Kaneki et al. | |
| 2018/0113241 A1 | * | 4/2018 | Powell | G06F 1/1626 |
| 2019/0177104 A1 | * | 6/2019 | Ishida | B65H 18/28 |
| 2019/0225842 A1 | * | 7/2019 | Kimura | C09J 175/04 |
| 2020/0157288 A1 | * | 5/2020 | Aida | C08F 214/265 |

FOREIGN PATENT DOCUMENTS

| | | |
|---|---|---|
| CN | 102737557 A | 10/2012 |
| CN | 102798997 A | 11/2012 |
| CN | 202615076 U | 12/2012 |
| CN | 103309063 A | 9/2013 |
| CN | 104157216 A | 11/2014 |
| CN | 104350445 A | 2/2015 |
| CN | 104737219 A | 6/2015 |
| CN | 104903783 A | 9/2015 |
| CN | 105546403 A | 5/2016 |
| CN | 106526968 A | 3/2017 |
| CN | 206155182 U | 5/2017 |
| JP | 2001083901 A | 3/2001 |
| JP | 2007078912 A | 3/2007 |
| JP | 2007114737 A | 5/2007 |
| JP | 2010049124 A | 3/2010 |
| JP | 2010072600 A | 4/2010 |
| JP | 2010102141 A | 5/2010 |
| JP | 2014112181 A | 6/2014 |
| JP | 2014126874 | 7/2014 |
| JP | 2016027352 A | 2/2016 |
| JP | 2017151397 | 8/2017 |
| JP | 2018004728 A | 1/2018 |
| WO | 2004111977 | 12/2004 |
| WO | 2013140464 | 9/2013 |

* cited by examiner

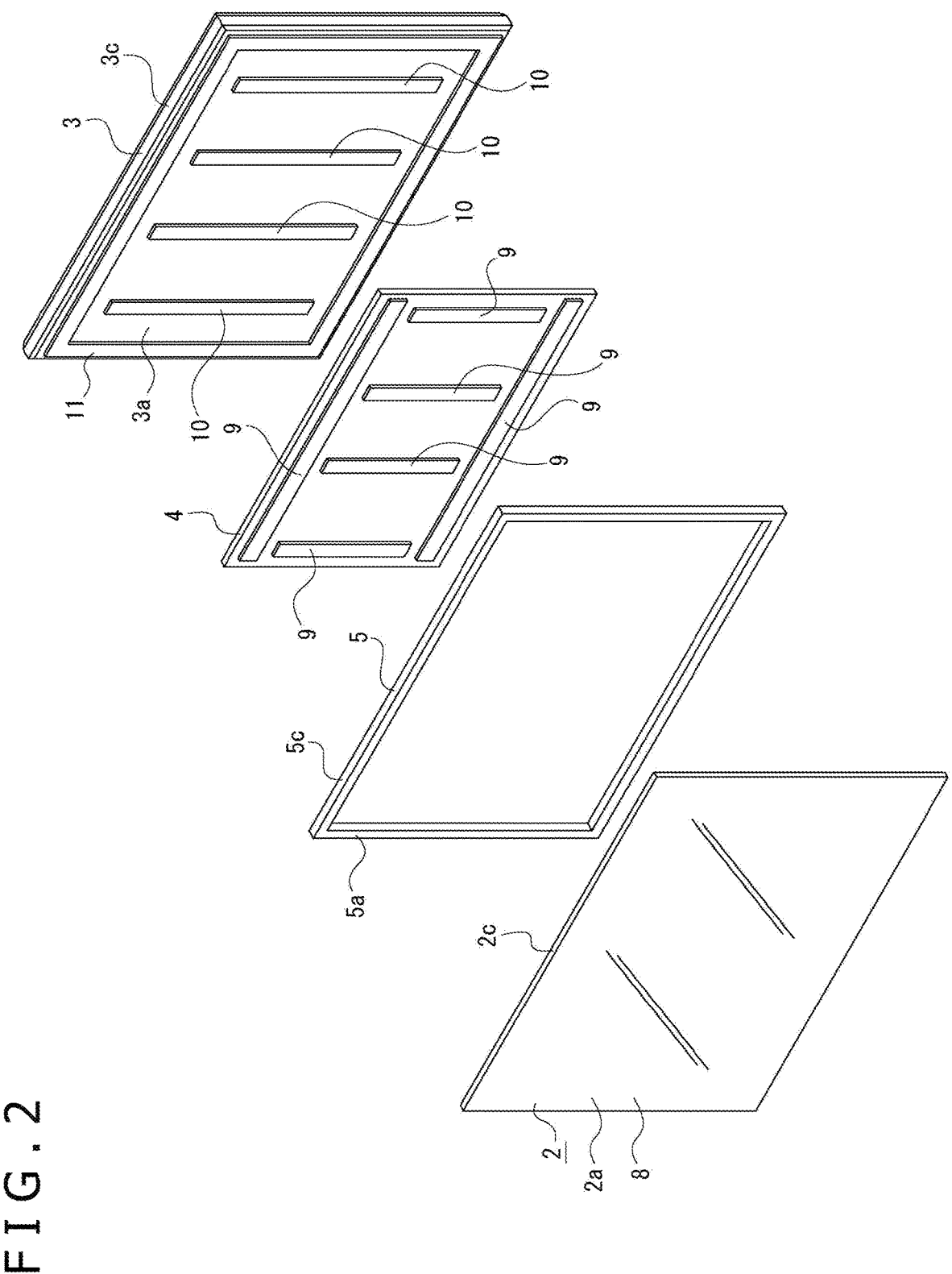
F I G . 2

DISPLAY APPARATUS

CROSS-REFERENCE TO RELATED APPLICATIONS

This application is a national phase entry under 35 U.S.C. § 371 of International Application No. PCT/JP2018/039164 filed Oct. 22, 2018, which claims the priority from Japanese Patent Application No. 2017-249008 filed in the Japanese Patent Office on Dec. 26, 2017, the entire contents of which are hereby incorporated by reference.

TECHNICAL FIELD

The present technology relates to a technical field of a display apparatus including a display and a back chassis that are covered by an outer frame from an outer periphery side.

BACKGROUND ART

Some display apparatuses of, for example, television receivers or personal computers are configured such that a display having a display surface on which an image is displayed is provided, a back chassis is disposed on a rear surface side of the display, and a bezel retains the display from an outer periphery side (e.g., refer to PTL 1).

In the display apparatus described in PTL 1, the bezel is provided with a base portion, a seating surface portion protruding from an intermediate portion of the base portion in a front-rear direction, and an attachment target portion protruding from a rear end portion of the base portion. The seating surface portion is fixed to a rear surface in an outer peripheral portion of the display through a cushion, and the attachment target portion is fixed to a front surface in an outer peripheral portion of the back chassis.

CITATION LIST

Patent Literature

[PTL 1]
Japanese Patent Laid-open No. 2016-27352

SUMMARY

Technical Problems

Meanwhile, in the structure as in the display apparatus described in PTL 1, a gap is formed between the bezel and an outer peripheral surface of the display, whereby foreign matters such as dust may enter the gap. This may degrade quality.

Since the gap is present between the bezel and the outer peripheral surface of the display, a viewer visually recognizes the gap. This may degrade a design property.

Particularly, since the gap is present on an outer periphery side of the display surface when an image or a video displayed on the display is visually recognized, the gap tends to be conspicuous. This may degrade the design property upon visually recognizing the image or the video.

Therefore, an object of a display apparatus of the present invention is to achieve improvement of quality and improvement of a design property.

Solution to Problems

As a first aspect, a display apparatus according to the present technology includes a display that displays an image on an display surface, a back chassis disposed on a side, of the display, opposite to the display surface, a sealing body disposed between the display and the back chassis, and an outer frame that is provided as a resin portion at least partly including a resin material, and covers the display and the back chassis from an outer periphery side, in which an inner peripheral surface of the resin portion is brought into close contact with an outer peripheral surface of the display and an outer peripheral surface of the back chassis.

With this configuration, no gap is produced between the outer frame and the display and between the outer frame and the back chassis in a direction orthogonal to a thickness direction of the display, for example, and the outer frame is positioned on the outer periphery side of the display and the back chassis.

As a second aspect, in the above-described display apparatus, it is desirable that the sealing body is formed in a frame shape, and the sealing body seals a space between the display and the back chassis.

With this configuration, the sealing body prevents the resin material from entering the space.

As a third aspect, in the above-described display apparatus, it is desirable that an outer peripheral surface of the outer frame is formed in a curved surface shape projecting outward.

With this configuration, the outer peripheral surface of the outer frame can be formed in a shape having no edge.

As a fourth aspect, in the above-described display apparatus, it is desirable that the outer frame is made transparent.

With this configuration, a person who visually recognizes the display surface hardly feels presence of the outer frame.

As a fifth aspect, in the above-described display apparatus, it is desirable that the outer frame is used as a light-guiding body that guides light.

With this configuration, light is guided by the outer frame.

As a sixth aspect, in the above-described display apparatus, it is desirable that the outer frame is formed with a reflection surface that internally reflects light.

With this configuration, light is reflected by the outer frame.

As a seventh aspect, in the above-described display apparatus, it is desirable that the outer frame is provided with an integrally-formed portion including a material different in composition or kind from the resin portion.

With this configuration, the integrally-formed portion is provided to the outer frame, together with the resin portion, thereby allowing the resin portion and the integrally-formed portion to have functions different from each other according to compositions or kinds.

As an eighth aspect, in the above-described display apparatus, it is desirable that rigidity of the integrally-formed portion is made higher than rigidity of the resin portion.

With this configuration, rigidity of the outer frame as a whole is improved.

As a ninth aspect, in the above-described display apparatus, it is desirable that an insert member having the integrally-formed portion is provided, and a continuous portion that is continuous to the integrally-formed portion and is positioned between the display and the back chassis is provided in the insert member.

With this configuration, the continuous portion is positioned between the display and the back chassis.

As a tenth aspect, in the above-described display apparatus, it is desirable that the continuous portion is fixed to the back chassis.

With this configuration, a positional relationship of the integrally-formed portion and the continuous portion with respect to the back chassis does not change.

As an eleventh aspect, in the above-described display apparatus, it is desirable that the continuous portion is used as the sealing body.

With this configuration, the continuous portion seals a space between the display and the back chassis.

As a twelfth aspect, in the above-described display apparatus, it is desirable that the continuous portion is used as a light-guiding body that guides light.

With this configuration, light is guided by the continuous portion.

As a thirteenth aspect, in the above-described display apparatus, it is desirable that a reflection surface that internally reflects light is formed in the continuous portion.

With this configuration, light is reflected by the continuous portion.

As a fourteenth aspect, in the above-described display apparatus, it is desirable that the back chassis is used as a light-guiding body that guides light.

With this configuration, light is guided by the back chassis.

Advantageous Effects of Invention

According to the present technology, no gap is produced between the outer frame and the display and between the outer frame and the back chassis in a direction orthogonal to a thickness direction of the display, for example, and the outer frame is positioned on an outer periphery side of the display and the back chassis, thereby achieving improvement of quality and improvement of a design property.

Note that effects described in the specification are illustrative in nature and not limited, and other effects may be provided.

BRIEF DESCRIPTION OF DRAWINGS

FIG. 2 is an exploded perspective view illustrating a part of the display apparatus.

DESCRIPTION OF EMBODIMENT

Hereinafter, an exemplary embodiment of a display apparatus of the present technology will be described with reference to the attached drawings.

The exemplary embodiment described below is a case where the display apparatus of the present technology is applied to a television receiver in which an image is displayed on its display.

Note that a range to which the present technology is applied is not limited to the television receiver, and the present technology can widely be applied to various display apparatuses such as a monitor used in, for example, a personal computer.

In the following description, a direction in which a display surface of the display apparatus (television receiver) is directed is defined as a front direction, and then front-rear, upper-lower, and left-right directions are represented. Note that the front-rear, upper-lower, and left-right directions described below are set for convenience of the description, and implementation of the present technology is not limited to those directions.

<Configuration of Display Apparatus>

Figure 1:
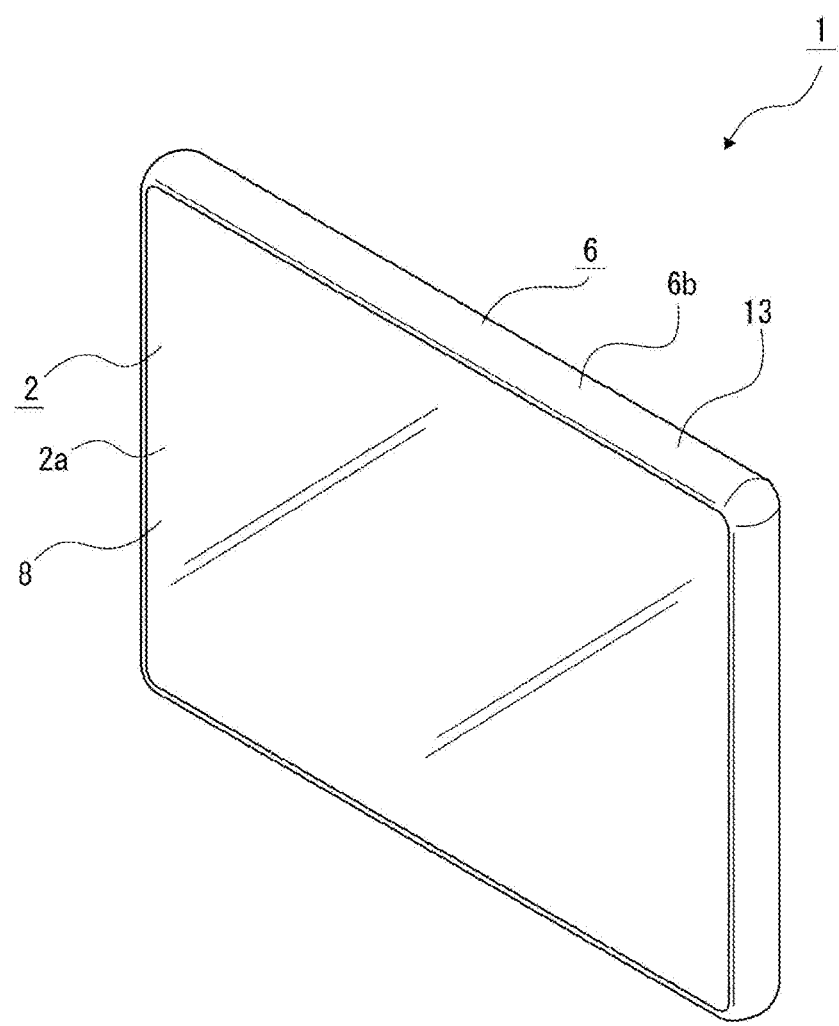
FIG. 1 illustrates a display apparatus of the present technology together with FIGS. 2 to 14, and is a perspective view illustrating the display apparatus.

A display apparatus (television receiver) 1 is formed in, for example, a substantially rectangle shape that is horizontally long and whose thickness in the front-rear direction is thin (refer to FIG. 1). For example, the display apparatus 1 is installed on an installation surface such as a desktop with a not-illustrated stand, or is attached on a wall surface with a not-illustrated bracket to be used.

Figure 3:
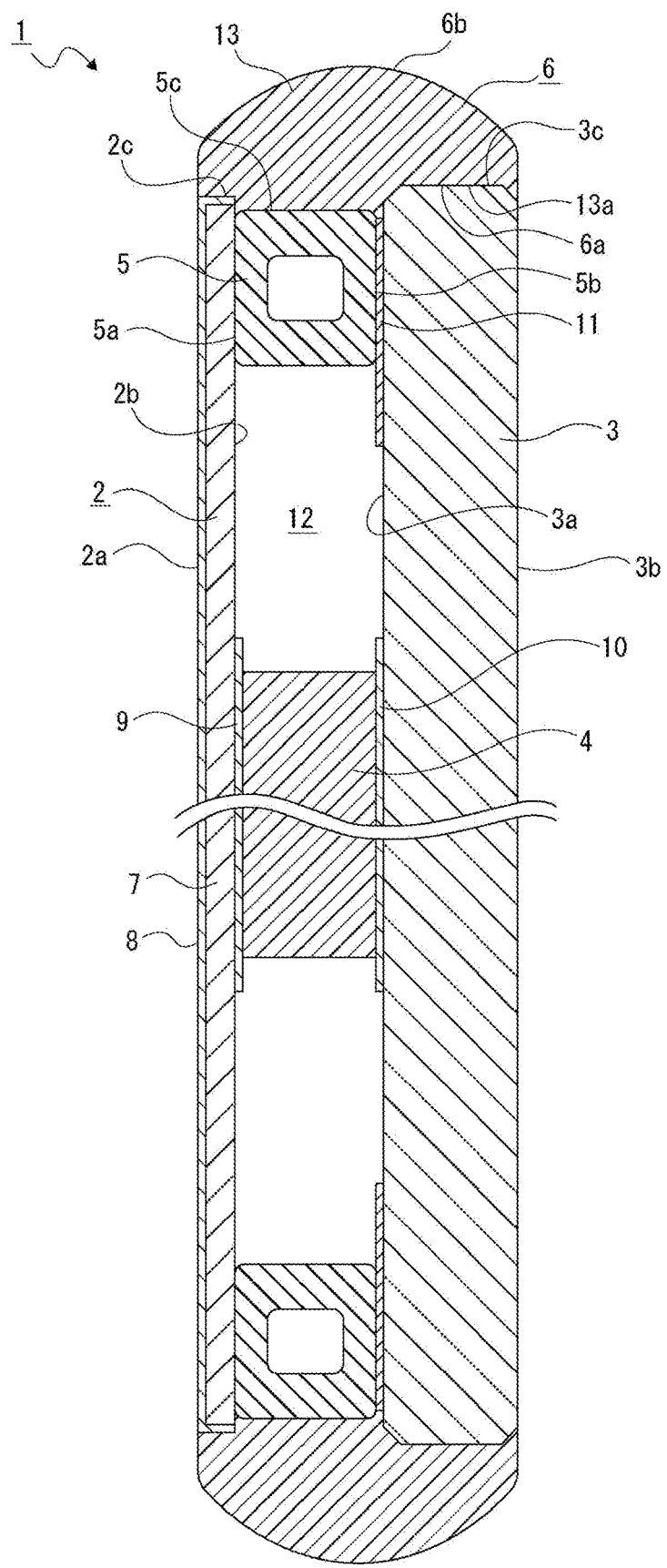
FIG. 3 is an enlarged cross-sectional view illustrating the display apparatus in a partially omitted manner.

The display apparatus 1 includes a display 2 on which an image is displayed, a back chassis 3 disposed behind the display 2, a heat radiation plate 4 internally disposed, a sealing body 5 positioned on an outer periphery side of the heat radiation plate 4, and an outer frame 6 disposed on an outer periphery side of the display 2 and the back chassis 3 (refer to FIG. 1 to FIG. 3).

The display 2 is formed in a plate shape directed in the front-rear direction, and is configured with an organic EL (Electro Luminescence) display of a light emission type that emits light by using an organic light-emitting phenomenon, for example. The display 2 includes a substrate 7 and a polarization film 8 stuck on a front surface and an outer peripheral surface of the substrate 7. A front surface of the display 2 serves as a display surface 2a that displays the image.

The display 2 is configured by laminating various layers such as a support layer, a display layer, an insulation layer, and a protection layer, and includes a plurality of driving elements and a plurality of light-emitting elements, which are respectively arranged in a matrix. Each light-emitting element emits light toward the front by being driven by a corresponding driving element, and includes a red light-emitting element, a green light-emitting element, and a blue light-emitting element, for example.

The display 2 includes a color filter. Light rays respectively emitted by the red light-emitting element, the green light-emitting element, and the blue light-emitting element pass through corresponding portions of the color filter to advance forward through the polarization film 8.

The back chassis 3 is formed in a flat-plate shape whose outer shape is substantially the same size as that of the display 2 by using glass, for example. The back chassis 3 includes glass having the flat-plate shape, thereby securing increased strength even in a case where the back chassis 3 is made thin. This can achieve improvement of strength of the display apparatus 1 and thinning of the display apparatus 1.

Note that a glass scattering prevention film may be stuck on a rear surface of the back chassis 3, for example.

An outer shape of the heat radiation plate 4 is made smaller than that of the display 2, and the heat radiation plate 4 is disposed between the display 2 and the back chassis 3. For example, the heat radiation plate 4 includes a metal material such as aluminum, and has a function for radiating heat generated in the display 2.

For example, the heat radiation plate 4 is stuck on a portion in a rear surface 2b of the display 2 excluding an outer peripheral portion by using adhesive tapes 9, 9, . . . such as double sided tapes. The adhesive tapes 9 are desirably including a material having high thermal conductivity.

Note that the heat radiation plate 4 may detachably be attached to the display 2 by using another means other than the adhesive tapes 9 to allow the heat radiation plate 4 to be separated from the display 2. In this case, a cushion having thermal conductivity may be disposed between the display 2 and the heat radiation plate 4, and the heat radiation plate 4 may be pressed against the display 2 through the cushion.

For example, the heat radiation plate 4 is stuck on a portion in a front surface 3a of the back chassis 3 excluding an outer peripheral portion by using adhesive tapes 10, 10, . . . such as the double sided tapes.

An outer shape of the sealing body 5 is made substantially the same as that of the display 2, and an inner shape of the sealing body 5 is made slightly larger than the heat radiation plate 4. The sealing body 5 includes a material having elasticity, for example, silicon. An outer peripheral portion in the rear surface 2b of the display 2 is pressed against a front surface 5a of the sealing body 5, and the display 2 is brought into close contact with the sealing body 5 in a separable manner. A rear surface 5b of the sealing body 5 is stuck on the outer peripheral portion in the front surface 3a of the back chassis 3 by using, for example, an adhesive tape 11 such as the double sided tape, which is formed in a frame shape. An outer peripheral portion of the display 2 is pressed against the sealing body 5. Therefore, the sealing body 5 is elastically deformed.

As described above, the sealing body 5 formed in the frame shape is stuck on the outer peripheral portion of the back chassis 3 by using the adhesive tape 11, and the outer peripheral portion of the display 2 is pressed against the front surface 5a of the sealing body 5. This allows the sealing body 5 to seal a space 12 between the display 2 and the back chassis 3.

The outer frame 6 is provided as a resin portion 13 that is entirely including a resin material, for example. An inner peripheral surface 6a of the outer frame 6 is brought into close contact with an outer peripheral surface 2c of the display 2, an outer peripheral surface 3c of the back chassis 3, and an outer peripheral surface 5c of the sealing body 5. Accordingly, in the outer frame 6, an inner peripheral surface 13a of the resin portion 13 is brought into close contact with the outer peripheral surface 3c and the outer peripheral surface 5c. In the outer frame 6, an outer peripheral surface 6b is formed into a curved surface shape projecting outward, for example.

The outer frame 6 is, for example, formed such that a base material having fluidity is filled on an outer periphery side of the display 2, the back chassis 3, and the sealing body 5, and after the base material is cooled and solidified, the base material is processed into a predetermined shape by cutting. In this manner, the outer frame 6 is formed by being filled with the base material having fluidity. This allows the inner peripheral surface 6a to be formed in a shape following the outer peripheral surface 2c of the display 2, the outer peripheral surface 3c of the back chassis 3, and the outer peripheral surface 5c of the sealing body 5. The inner peripheral surface 6a is thus brought into close contact with the outer peripheral surface 2c of the display 2, the outer peripheral surface 3c of the back chassis 3, and the outer peripheral surface 5c of the sealing body 5.

Accordingly, in the display apparatus 1, due to close contact between the inner peripheral surface 6a of the outer frame 6 and the outer peripheral surface 2c of the display 2, no gap is present between the outer frame 6 and the display 2. Further, due to close contact between the inner peripheral surface 6a of the outer frame 6 and the outer peripheral surface 3c of the back chassis 3, no gap is also present between the outer frame 6 and the back chassis 3.

Furthermore, along a thickness direction (front-rear direction) of the display apparatus 1, a size (a width in the front-rear direction) of the outer frame 6 is made the same as a distance from the display surface 2a of the display 2 to the rear surface 3b of the back chassis 3.

Note that the outer frame 6 is formed by being filled with the base material having fluidity as described above, thereby allowing a reduction in manufacturing cost in comparison with a structure in which a bezel including, for example, metal or resin is attached to the outer peripheral portion and the like of the display 2.

SUMMARY

As described above, the display apparatus 1 is provided with the outer frame 6 that is includes the resin material and covers the display 2 and the back chassis 3 from the outer periphery side. The inner peripheral surface 13a of the resin portion 13 of the outer frame 6 is brought into close contact with the outer peripheral surface 2c of the display 2 and the outer peripheral surface 3c of the back chassis 3.

Accordingly, along the direction orthogonal to the thickness direction of the display 2, no gap is produced between the outer frame 6 and the display 2 and between the outer frame 6 and the back chassis 3, whereby foreign matters such as dust do not enter between the outer frame 6 and the display 2 and between the outer frame 6 and the back chassis 3. This can achieve improvement of quality of the display apparatus 1.

Furthermore, along the direction orthogonal to the thickness direction of the display 2, no gap is produced between the outer frame 6 and the display 2, and the outer frame 6 can be made transparent or colorized in any color, thereby enhancing freedom of design. This can achieve improvement of the design property.

Furthermore, along the direction orthogonal to the thickness direction of the display 2, no gap is produced between the outer frame 6 and the display 2 and between the outer frame 6 and the back chassis 3, and the outer frame 6 is positioned on the outer periphery side of the display 2 and the back chassis 3. Therefore, the display apparatus 1 is not increased in size along the thickness direction (front-rear direction) and the direction orthogonal to the thickness direction, thereby allowing a reduction in size of the display apparatus 1.

Furthermore, the outer frame 6 is positioned on the outer periphery side of the display 2 and the back chassis 3 over entire peripheries while being brought into close contact with the display 2 and the back chassis 3, thereby allowing rigidity of the display apparatus 1 to be increased. This can achieve improvement of quality of the display apparatus 1.

Furthermore, the sealing body 5 is formed in the frame shape, and the space 12 between the display 2 and the back chassis 3 is sealed by the sealing body 5, thereby preventing the resin material before being cured from entering the space 12 by the sealing body 5, in a case where the outer frame 6 includes a curing type resin material. This can protect structures disposed between the display 2 and the back chassis 3.

Furthermore, the outer peripheral surface 6*b* of the outer frame 6 is formed in the curved surface shape projecting outward, thereby allowing the outer peripheral surface 6*b* of the outer frame 6 to be formed in a shape having no edge. Therefore, a user does not have uncomfortable feeling, when the user touches the outer frame 6. This can achieve improvement of quality of the display apparatus 1.

Note that the outer frame 6 may be colorized, or the outer frame 6 may be colored, or colorless and transparent. When the outer frame 6 is made transparent, a person who visually recognizes the display surface 2*a* hardly feels presence of the outer frame 6, and tends to visually recognize as if no structure is present outside the image or the video displayed on the display surface 2*a*. This can achieve improvement of visibility of the image or the video.

Note that the outer frame 6 may be colorized, or the outer frame 6 may be colored, or colorless and transparent. When the outer frame 6 is made transparent, a person who visually recognizes the display surface 2*a* hardly feels presence of the outer frame 6, and tends to visually recognize as if no structure is present outside the image or the video displayed on the display surface 2*a*. This can achieve improvement of visibility of the image or the video.

<Modifications>

Hereinafter, various modifications of the outer frame 6 or other components will be described (refer to FIG. 4 to FIG. 12).

Note that for the various modifications described below, only parts different from the display apparatus 1 will be described in detail, and description of other parts is omitted while attaching reference signs identical to those attached to identical parts in the display apparatus 1.

Figure 4:
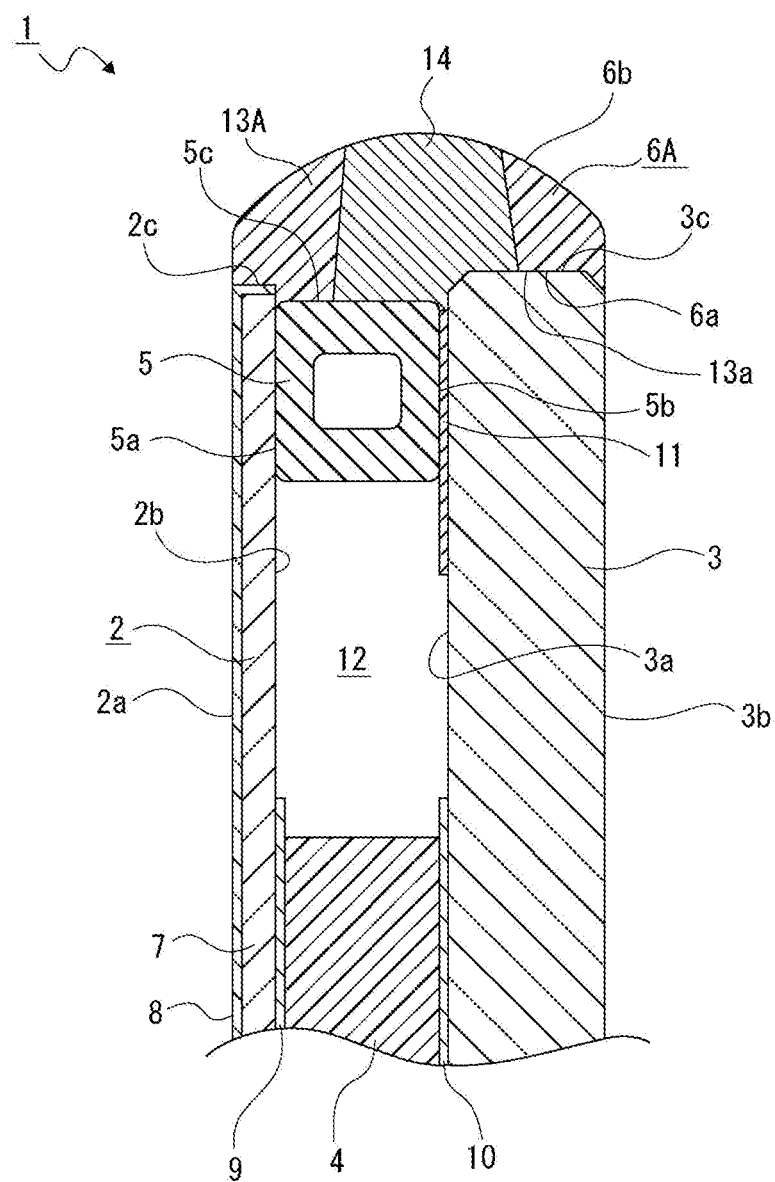
FIG. 4 is an enlarged cross-sectional view illustrating a first modification.

First, a first modification will be described (refer to FIG. 4). In the first modification, configurations of the display 2, the back chassis 3, the heat radiation plate 4, and the sealing body 5 are the same as those in the display apparatus 1, and an outer frame 6A is provided in place of the outer frame 6.

The outer frame 6A is configured with a resin portion 13A including a resin material, and an integrally-formed portion 14 integrally formed with the resin portion 13A by, for example, insert molding. The integrally-formed portion 14 is positioned at an intermediate portion of the outer frame 6A in the front-rear direction, for example. The resin portion 13A is disposed at front and rear portions of the integrally-formed portion 14 in the front-rear direction. In the outer frame 6A, the resin portion 13A is brought into close contact with the outer peripheral surface 2*c* of the display 2, the outer peripheral surface 3*c* of the back chassis 3, and the outer peripheral surface 5*c* of the sealing body 5, and the integrally-formed portion 14 is also partly brought into close contact with the outer peripheral surface 3*c* of the back chassis 3. An outer peripheral surface 6*b* of the outer frame 6A is formed in a curved surface shape projecting outward, for example.

The integrally-formed portion 14 includes a material different in composition or kind from the resin portion 13A. The material of the integrally-formed portion 14 may be resin, metal, or a material other than resin and metal.

For example, the outer frame 6A is formed such that in a state where the integrally-formed portion 14 is attached to the back chassis 3, a base material having fluidity for forming the resin portion 13A is filled on an outer periphery side of the display 2, the back chassis 3, and the sealing body 5, and after the base material is cooled and solidified, the base material is processed in a predetermined shape by cutting.

As described above, the integrally-formed portion 14 including the material different in composition or kind from the resin portion 13A is provided to the outer frame 6A, together with the resin portion 13A. The providing the resin portion 13A and the integrally-formed portion 14 to the outer frame 6A allows the resin portion 13A and the integrally-formed portion 14 to respectively have functions different from each other according to compositions and kinds. This can achieve improvement of functionality of the outer frame 6A.

For example, when rigidity of the integrally-formed portion 14 is made higher than rigidity of the resin portion 13A, rigidity of the outer frame 6A as a whole is made higher. This can protect the display 2 and the back chassis 3 in a stable state.

Furthermore, when the resin portion 13A and the integrally-formed portion 14 are made to have different colors, or one of the resin portion 13A and the integrally-formed portion 14, which has been made transparent, is made opaque, freedom of design is enhanced. This can achieve improvement of the design property.

Figure 5:
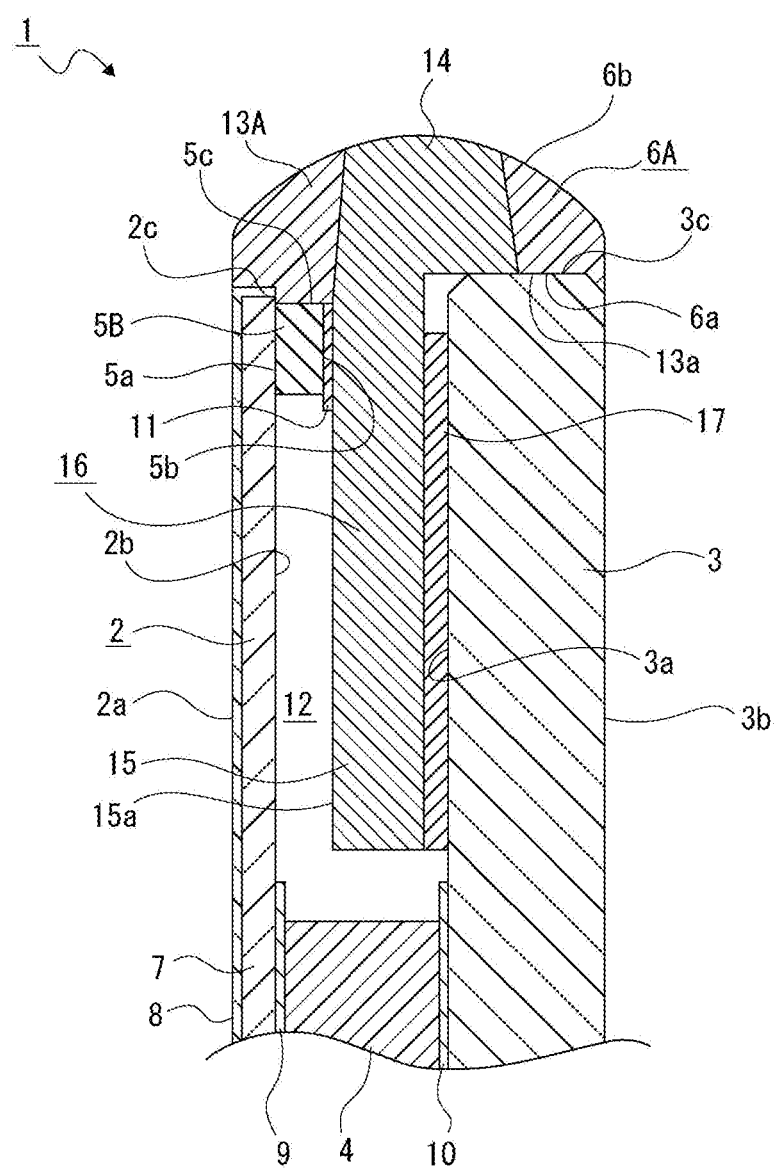
FIG. 5 is an enlarged cross-sectional view illustrating a second modification.

Next, a second modification will be described (refer to FIG. 5). In the second modification, configurations of the display 2, the back chassis 3, and the heat radiation plate 4 are the same as those in the display apparatus 1, the outer frame 6A is provided in place of the outer frame 6, and a portion continuous to the integrally-formed portion 14 is provided.

The portion continuous to the integrally-formed portion 14 is provided as a continuous portion 15, and the continuous portion 15 protrudes from the integrally-formed portion 14 toward the space 12 that is present on an inner side. The integrally-formed portion 14 and the continuous portion 15 are integrally provided as portions of an insert member 16. In the insert member 16, the continuous portion 15 is stuck on the outer peripheral portion in the front surface 3*a* of the back chassis 3 by, for example, adhesive tapes 17, 17, . . . such as the double sided tapes.

Accordingly, in a case where the insert member 16 is used, it is unnecessary for the integrally-formed portion 14 to be attached to the back chassis 3.

A sealing body 5B is disposed between the display 2 and the continuous portion 15. The sealing body 5B is fixed such that the rear surface 5*b* is stuck on an outer peripheral portion in a front surface 15*a* of the continuous portion 15 by, for example, an adhesive tape 11. An outer peripheral portion of the display 2 is pressed against a front surface 5*a* of the sealing body 5B.

The insert member 16 includes a material different in composition or kind from the resin portion 13A. The material of the insert member 16 may be resin, metal, or a material other than resin and metal.

For example, the insert member 16 is formed such that in a state where the continuous portion 15 is attached to the back chassis 3, a base material having fluidity for forming the resin portion 13A is filled on an outer periphery side of the display 2, the back chassis 3, and the sealing body 5B, and after the base material is cooled and solidified, the base material is processed in a predetermined shape by cutting.

As described above, the insert member 16 including the integrally-formed portion 14 is provided, and the insert member 16 is provided with the continuous portion 15 that is continuous to the integrally-formed portion 14 and is positioned between the display 2 and the back chassis 3, thereby positioning the continuous portion 15 between the display 2 and the back chassis 3.

Accordingly, the continuous portion 15 retains a predetermined interval between the display 2 and the back chassis 3, and therefore, a proper positional relationship between the display 2 and the back chassis 3 can be retained.

Further, the continuous portion 15 can be used as a portion that has a function similar to or different from that of the integrally-formed portion 14. This can achieve improvement of the functionality of the display apparatus 1.

Furthermore, since the continuous portion 15 is fixed to the back chassis 3, a positional relationship of the integrally-formed portion 14 and the continuous portion 15 with respect to the back chassis 3 does not change. This allows the outer frame 6A to be stably brought into close contact with the back chassis 3.

Figure 6:
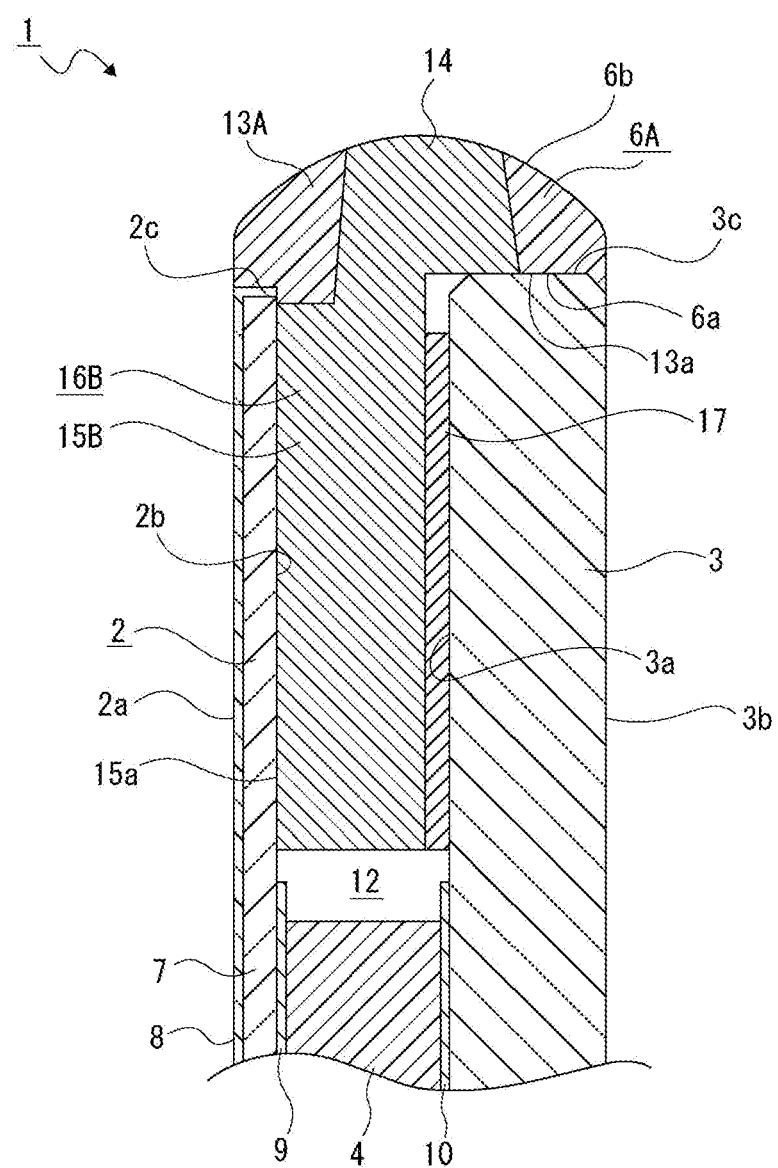
FIG. 6 is an enlarged cross-sectional view illustrating a different configuration of the second modification.

Note that, in the second modification, a continuous portion 15B may be provided so as to be brought into close contact with the rear surface 2b of the display 2 without providing the sealing body 5B (refer to FIG. 6). In this case, the integrally-formed portion 14 and the continuous portion 15B are provided as portions of an insert member 16B.

By providing the above-described continuous portion 15B, the continuous portion 15B is used as the sealing body, and the space 12 between the display 2 and the back chassis 3 is sealed by the continuous portion 15B. Therefore, it is unnecessary to provide a dedicated sealing body, thereby achieving a reduction in part count.

Figure 7:
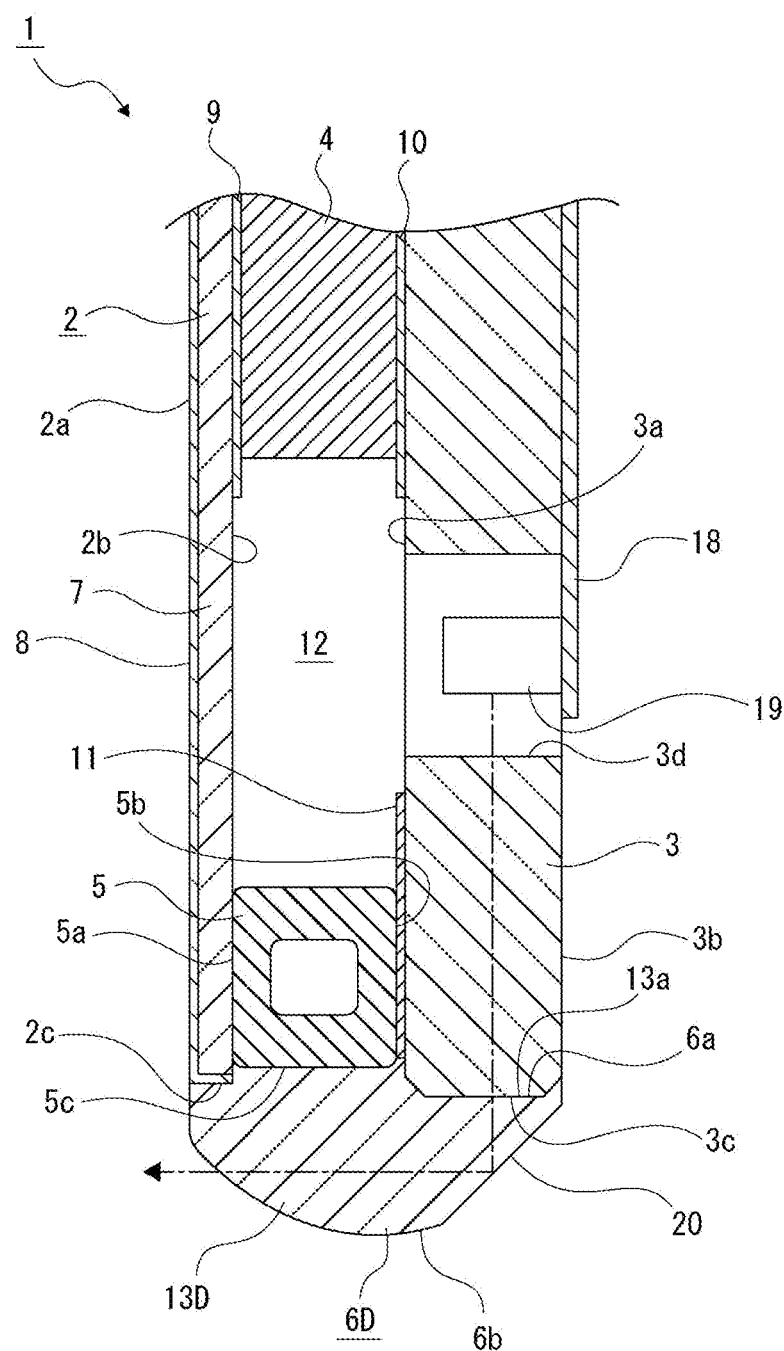
FIG. 7 is an enlarged cross-sectional view illustrating a third modification.
Figure 8:
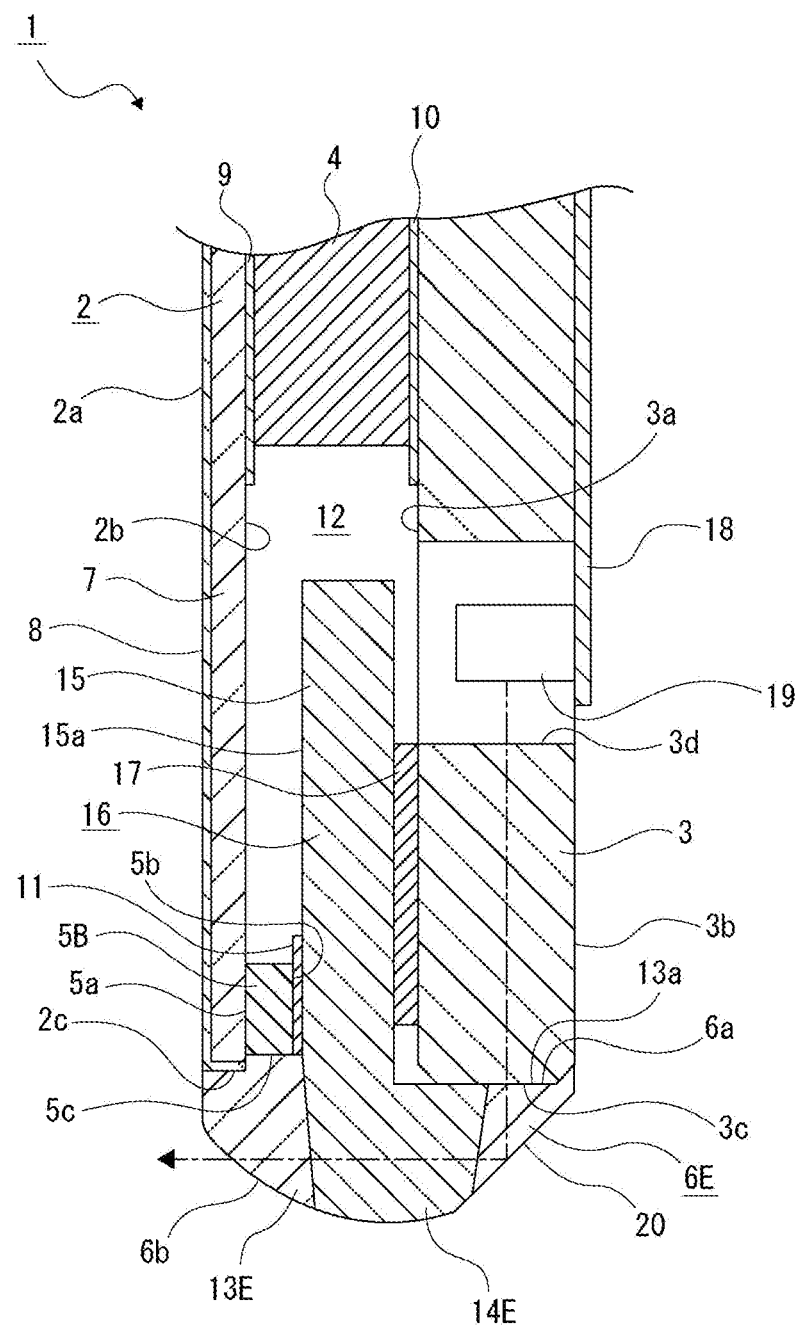
FIG. 8 is an enlarged cross-sectional view illustrating a different configuration of the third modification.

Next, a third modification will be described (refer to FIG. 7). In the third modification, configurations of the display 2, the heat radiation plate 4, and the sealing body 5 are the same as those in the display apparatus 1, a circuit board is attached to the back chassis 3, and an outer frame 6D whose shape is partly different from that of the outer frame 6 is provided.

For example, the back chassis 3 is configured to be transparent. An arrangement hole 3d penetrating the back chassis 3 in the front-rear direction is formed at a position close to a lower end of the back chassis 3.

The circuit board 18 is attached to the rear surface 3b of the back chassis 3 while being directed along the front-rear direction, and a light source 19 is mounted on the circuit board 18. A light emitting diode (LED) is used as the light source 19. The light source 19 is positioned in the arrangement hole 3d.

The outer frame 6D is configured as a resin portion 13D entirely including a transparent resin material, for example, and has a reflection surface 20 that internally reflects light at a position immediately below the back chassis 3.

Light is emitted downwardly from the light source 19, and the emitted light enters the inside of the back chassis 3. The light that has entered the inside of the back chassis 3 is downwardly guided by the back chassis 3, enters the outer frame 6D, is forwardly reflected on the reflection surface 20, and is emitted from the outer frame 6D toward the front. Accordingly, the back chassis 3 and the outer frame 6D function as a light-guiding body that guides light along a predetermined direction.

Such a configuration is preferable as, for example, a configuration in which the light from the light source 19 is used to indicate, for example, power on/off or mode-setting states depending on turning on/off of the light, is used for illumination light, or is used as detection light for, for example, a motion detector or an illuminance sensor to control, for example, power on/off or illuminance depending on a distance to a person.

As described above, the outer frame 6D is used as the light-guiding body that guides light, whereby the light is guided by the outer frame 6D. This can achieve improvement of freedom of an arrangement position of each member related to light such as the circuit substrate 18 or the light source 19, and improvement of functionality of the outer frame 6D.

In addition, it is unnecessary to provide a dedicated light-guiding body that guides light, thereby achieving a reduction in parts count of the display apparatus 1.

Furthermore, the outer frame 6D is formed with the reflection surface 20 that internally reflects light that has entered the outer frame 6D, whereby the light is reflected by the outer frame 6D. This can achieve further improvement of freedom of the arrangement position of each member related to light such as the circuit substrate 18 or the light source 19, and further improvement of the functionality of the outer frame 6D.

In addition, it is unnecessary to provide the dedicated reflection body that reflects light, thereby achieving a further reduction in parts count of the display apparatus 1.

Furthermore, the back chassis 3 is also used as the light-guiding body that guides light, whereby the light is guided by the back chassis 3. This can achieve further improvement of freedom of the arrangement position of each member related to light such as the circuit substrate 18 or the light source 19, and further improvement of functionality of the back chassis 3.

In addition, it is unnecessary to provide the dedicated light-guiding body that guides light, thereby achieving a further reduction in parts count of the display apparatus 1.

Note that, the above third modification describes an example in which the reflection surface 20 is formed in the outer frame 6D entirely provided as the resin portion 13D. However, an outer frame 6E can be used in place of the outer frame 6D (refer to FIG. 8). The outer frame 6E includes a resin portion 13E and an integrally-formed portion 14E, and includes the reflection surface 20 at a position extending over the resin portion 13E and the integrally-formed portion 14E, for example.

In a case where the outer frame 6E is provided, light emitted downwardly from the light source 19 enters the outer frame 6E from the inside of the back chassis 3, is reflected forwardly on the reflection surface 20 of the outer frame 6E, and is emitted from the outer frame 6E toward the front. Accordingly, the back chassis 3 and the outer frame 6E function as the light-guiding body that guides light along the predetermined direction in this case.

The above third modification describes an example in which the circuit board 18 is attached to the rear surface 3b of the back chassis 3 while being directed along the front-rear direction, and light is emitted downwardly from the light source 19. However, the direction of the circuit board 18 is changed, and light can be configured to be emitted downwardly from the light source 19 as described below (refer to FIG. 9 and FIG. 10).

Figure 9:
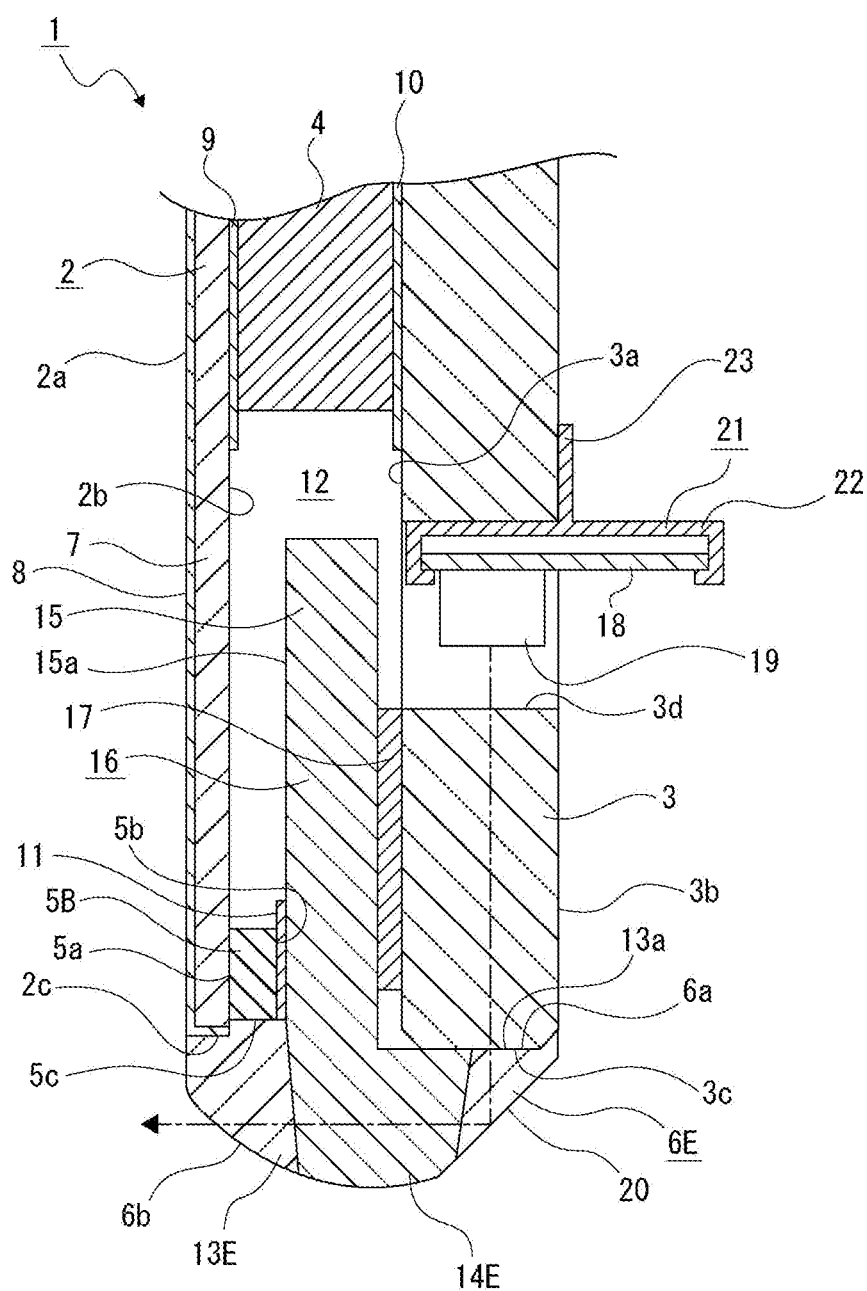
FIG. 9 is an enlarged cross-sectional view illustrating a configuration provided with a bracket in the third modification.

For example, the circuit board 18 can be directed along the upper-lower direction using a bracket 21 (refer to FIG. 9). The bracket 21 includes a case 22 opening downwardly and an attachment target portion 23 that protrudes upward from the case 22.

The circuit board 18 is held in the case 22 while being directed along the upper-lower direction, and the light source 19 is mounted on a lower surface of the circuit board 18. The attachment target portion 23 of the bracket 21 is attached to the rear surface 3b of the back chassis 3, and a part of the case 22, a part of the circuit board 18, and the light source 19 are positioned in the arrangement hole 3d.

Light is emitted downwardly from the light source 19, and the emitted light enters the inside of the back chassis 3.

Figure 10:
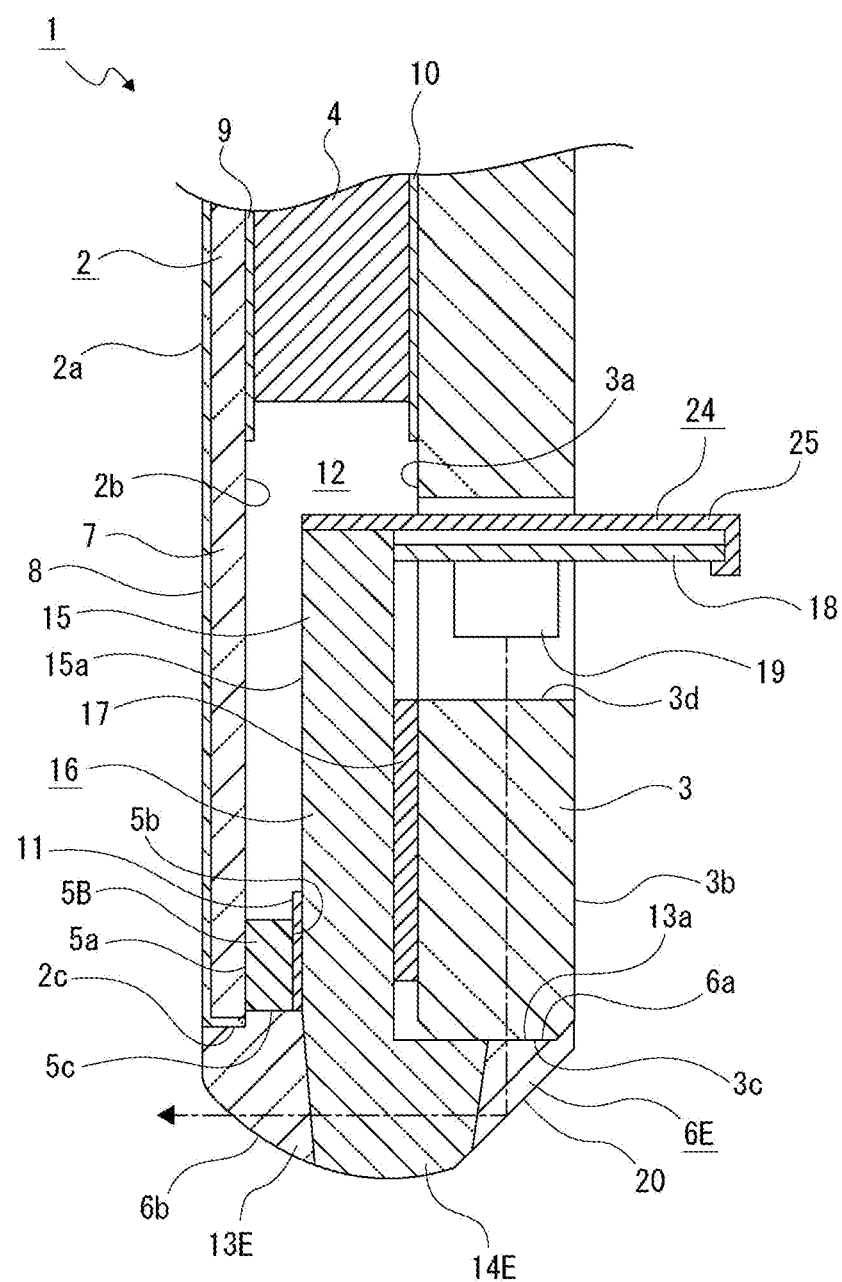
FIG. 10 is an enlarged cross-sectional view illustrating a configuration provided with a different bracket in the third modification.

Furthermore, for example, the circuit board 18 can be directed along the upper-lower direction using a bracket 24 (refer to FIG. 10). The bracket 24 includes a case 25 opening downwardly as well as forwardly.

The circuit board 18 is held in the case 25 while being directed along the upper-lower direction, and the light source 19 is mounted on the lower surface of the circuit board 18. A front end of the case 25 of the bracket 24 is inserted into the arrangement hole 3d and is attached to the continuous portion 15. A front end of the circuit board 18 is also attached to the continuous portion 15.

The front end of the case 25 and the front end of the circuit board 18 are attached to the continuous portion 15, thereby positioning a part of the case 25 in the arrangement hole 3d together with the light source 19. Light is emitted downwardly from the light source 19, and the emitted light enters the inside of the back chassis 3.

Note that the above third modification describes an example in which the light emitted downwardly from the light source 19 is emitted from a lower end portion of the outer frame 6, 6D, and 6E. However, the display apparatus 1 can be configured such that light emitted upwardly or laterally from the light source 19 is emitted from an upper end portion or lateral side portions of the outer frame 6, 6D, and 6E.

Figure 11:
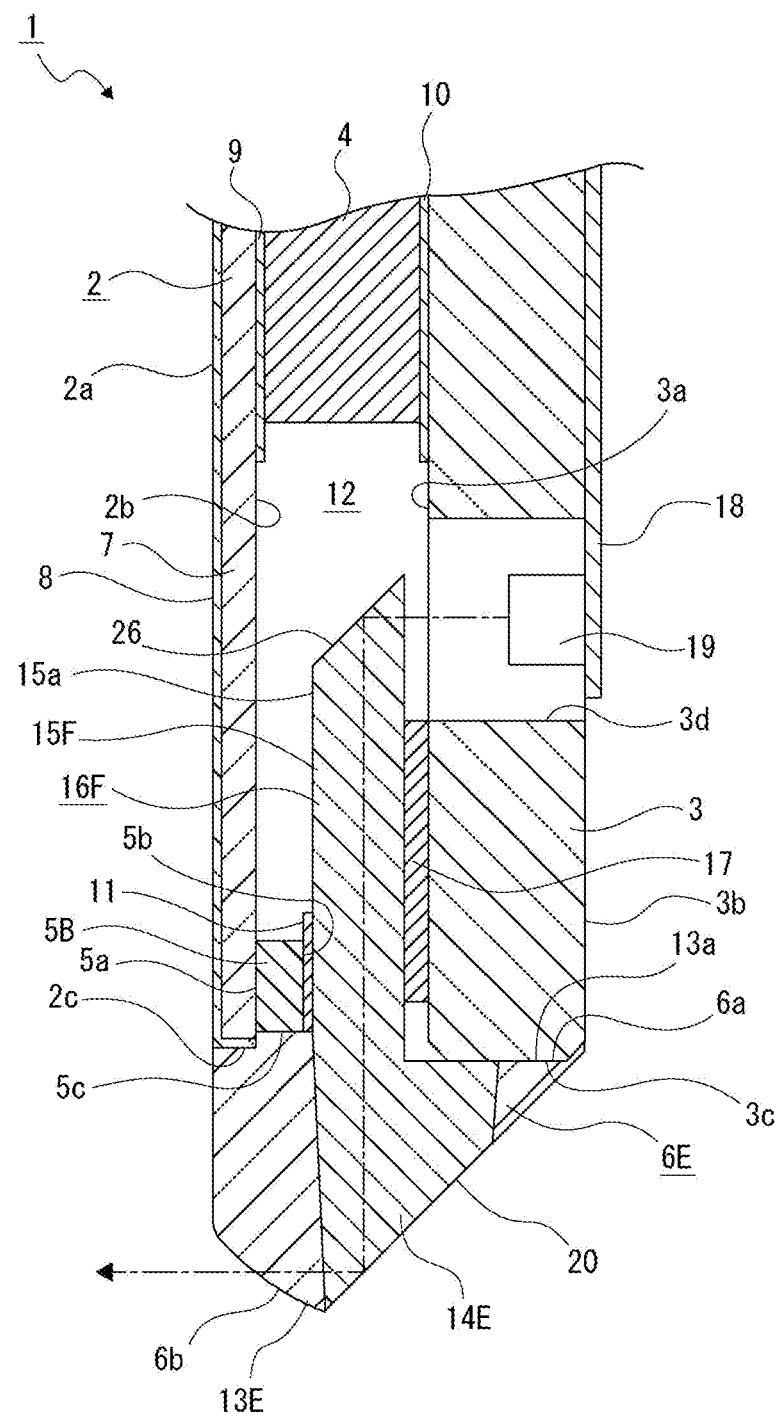
FIG. 11 is an enlarged cross-sectional view illustrating a fourth modification.
Figure 12:
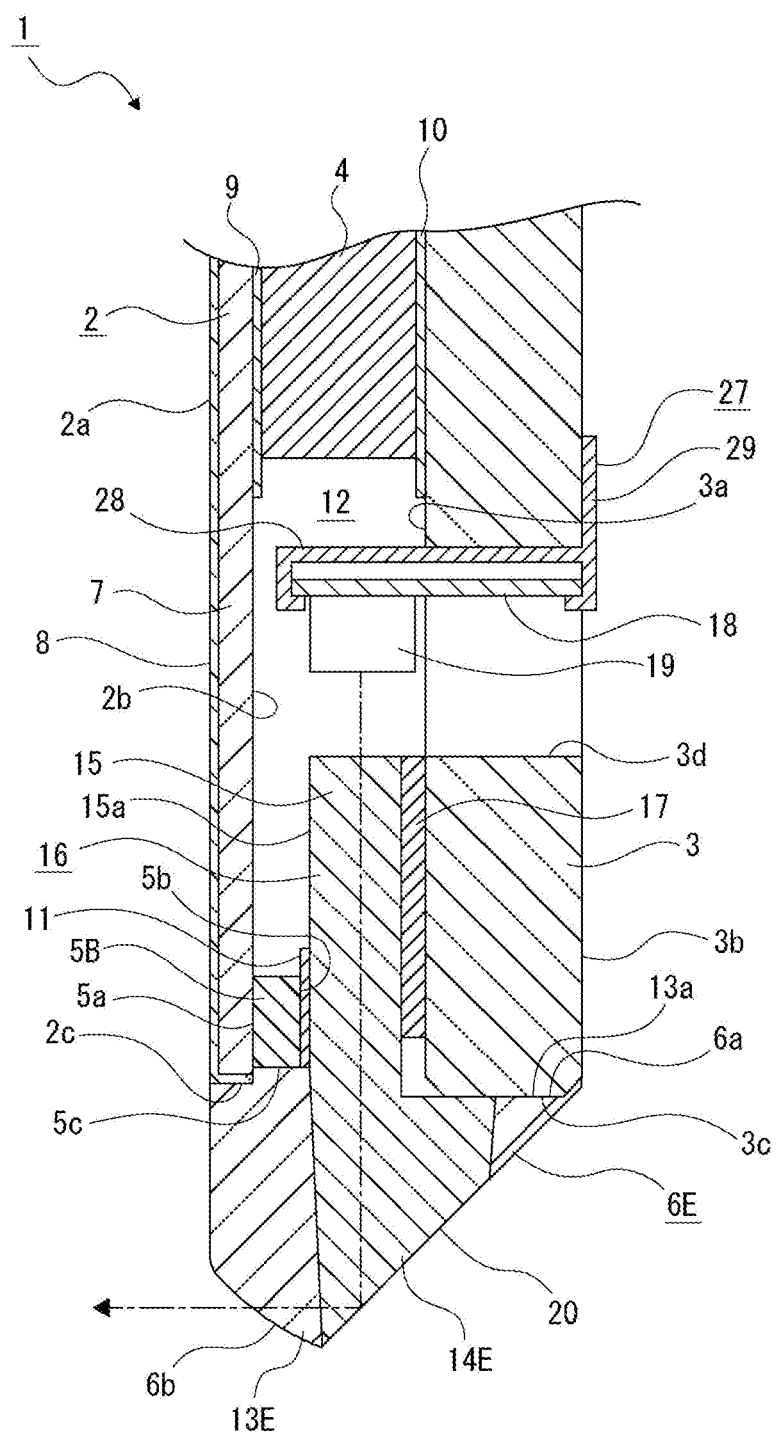
FIG. 12 is an enlarged cross-sectional view illustrating a different configuration of the fourth modification.

Subsequently, a fourth modification will be described (refer to FIG. 11). In the fourth modification, configurations of the display 2 and the heat radiation plate 4 are the same as those in the display apparatus 1, a circuit board is attached to the back chassis 3, and the outer frame 6E and the continuous portion 15F are provided.

The arrangement hole 3d penetrating the back chassis 3 along the front-rear direction is formed at a position close to a lower end of the back chassis 3.

The circuit board 18 is attached to the rear surface 3b of the back chassis 3 while being directed along the front-rear direction, and the light source 19 is mounted on the circuit board 18. The light source 19 is positioned in the arrangement hole 3d.

The continuous portion 15F is provided so as to be continuous to the integrally-formed portion 14E of the outer frame 6E, and the integrally-formed portion 14E and the continuous portion 15F are provided as portions of an insert member 16F. The outer frame 6E and the continuous portion 15F are made transparent, for example. A reflection surface 26 that internally reflects light is provided at an end, of the continuous portion 15F, opposite to the integrally-formed portion 14E.

Light is emitted forwardly from the light source 19, and the emitted light enters the inside of the continuous portion 15F. The light that has entered the inside of the continuous portion 15F is reflected downwardly on the reflection surface 26, is guided downwardly by the continuous portion 15F and the integrally-formed portion 14E, is reflected forwardly on the reflection surface 20, and is emitted from the outer frame 6E toward the front. Accordingly, the continuous portion 15F and the outer frame 6E function as the light-guiding body that guides light along a predetermined direction.

As described above, the continuous portion 15F is used as the light-guiding body that guides light, whereby the light is guided by the continuous portion 15F. This can achieve improvement of freedom of an arrangement position of each member related to light such as the circuit substrate 18 or the light source 19, and improvement of functionality of the continuous portion 15F.

In addition, it is unnecessary to provide the dedicated light-guiding body that guides light, thereby achieving a reduction in parts count of the display apparatus 1.

Furthermore, the continuous portion 15F is formed with the reflection surface 26 that internally reflects light, whereby the light is reflected by the continuous portion 15F. This can achieve further improvement of freedom of the arrangement position of each member related to light such as the circuit substrate 18 or the light source 19, and further improvement of the functionality of the continuous portion 15F.

In addition, it is unnecessary to provide the dedicated reflection body that reflects light, thereby achieving a further reduction in parts count of the display apparatus 1.

Note that the above fourth modification describes an example in which the circuit board 18 is attached to the rear surface 3b of the back chassis 3 while being directed along the front-rear direction, and light is emitted forwardly from the light source 19. However, a configuration in which the circuit board 18 is directed along the upper-lower direction, and light is emitted downwardly from the light source 19 can be used (refer to FIG. 12). In this case, the continuous portion 15 having no reflection surface 26 is used in place of the continuous portion 15F.

For example, the circuit board 18 can be directed along the upper-lower direction using a bracket 27. The bracket 27 includes a case 28 opening downwardly and an attachment target portion 29 that protrudes upward from a rear end of the case 28.

The circuit board 18 is held in the case 28 while being directed along the upper-lower direction, and the light source 19 is mounted on the lower surface of the circuit board 18. The attachment target portion 29 of the bracket 27 is attached on the rear surface 3b of the back chassis 3, and a front half portion of the case 28 is inserted into the arrangement hole 3d. The light source 19 is then positioned immediately above the continuous portion 15.

Light is emitted downwardly from the light source 19, and the emitted light enters the inside of the continuous portion 15.

Note that the above fourth modification describes an example in which the light is emitted from the lower end portion of the outer frame 6E. However, the display apparatus 1 can be configured such that light from the light source 19 is emitted from an upper end portion or lateral side portions of the outer frame 6E.

Furthermore, the above modification describes an example in which the light emitted from the light source 19 is reflected. However, for example, a configuration in which the light emitted from the light source 19 is diffused in the outer frame 6, 6D, and 6E, and therefore the outer frame 6, 6D, and 6E looks like shining can be achieved.

<Others>

Figure 13:
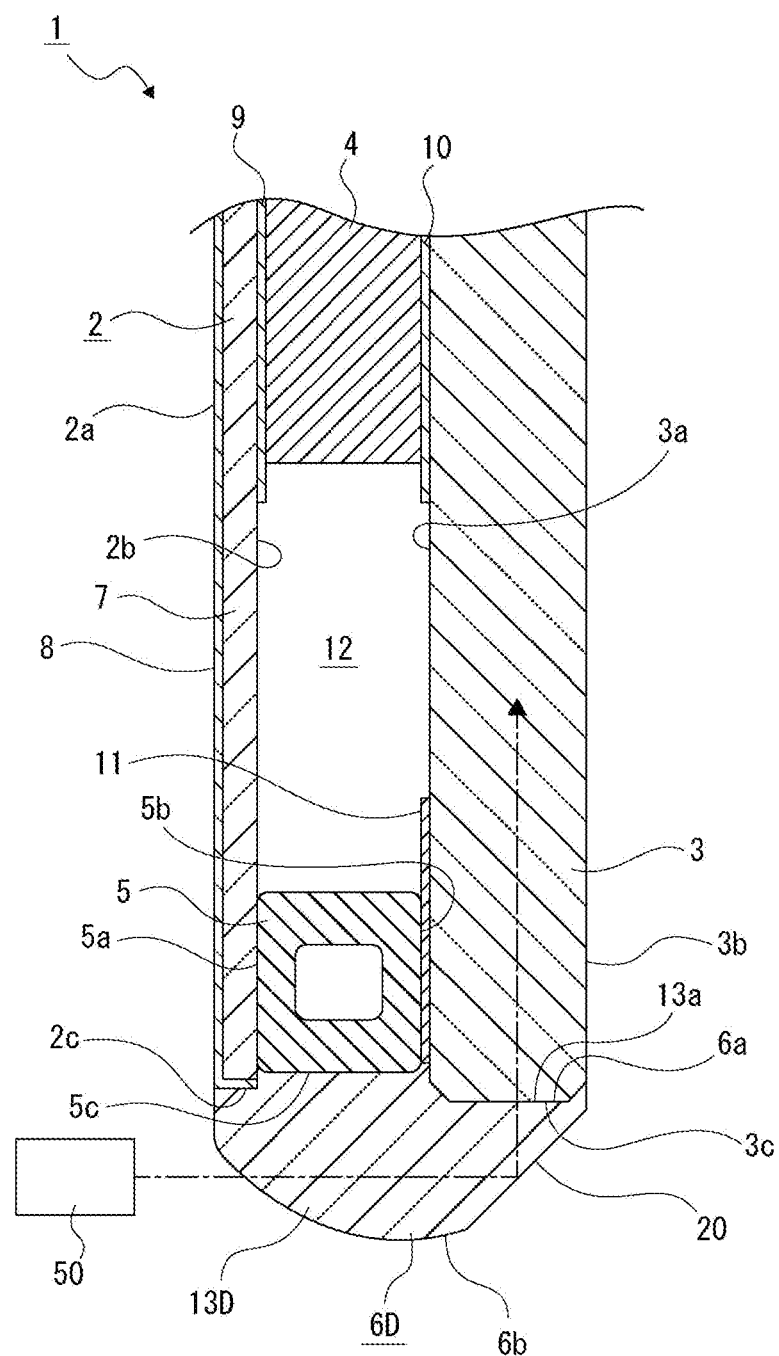
FIG. 13 is an enlarged cross-sectional view illustrating a configuration with which infrared light is guided.

For example, the display apparatus 1 can be configured such that infrared light emitted from an infrared-light emission portion 50 of, for example, a remote control device is guided to a light reception portion of, for example, a sensor along a predetermined route, to perform a predetermined function (refer to FIG. 13).

For example, the infrared light can be configured so as to enter the outer frame 6D, to be reflected on the reflection surface 20, to be guided through the inside of the back chassis 3, and to enter a predetermined light reception portion. In this case, the outer frame 6D and the back chassis 3 function as the light-guiding body.

Note that the light-guiding body that guides the infrared light is not limited to the outer frame 6D and the back chassis 3, and for example, the outer frame 6E or the continuous portion 15, 15B, and 15F can be used.

<Application to Another Display Apparatus>

An example in which the present technology is applied to the display apparatus 1 that uses the organic EL display is described above. However, the present technology is applicable to another kind of display apparatus that uses a display other than the organic EL display.

Figure 14:
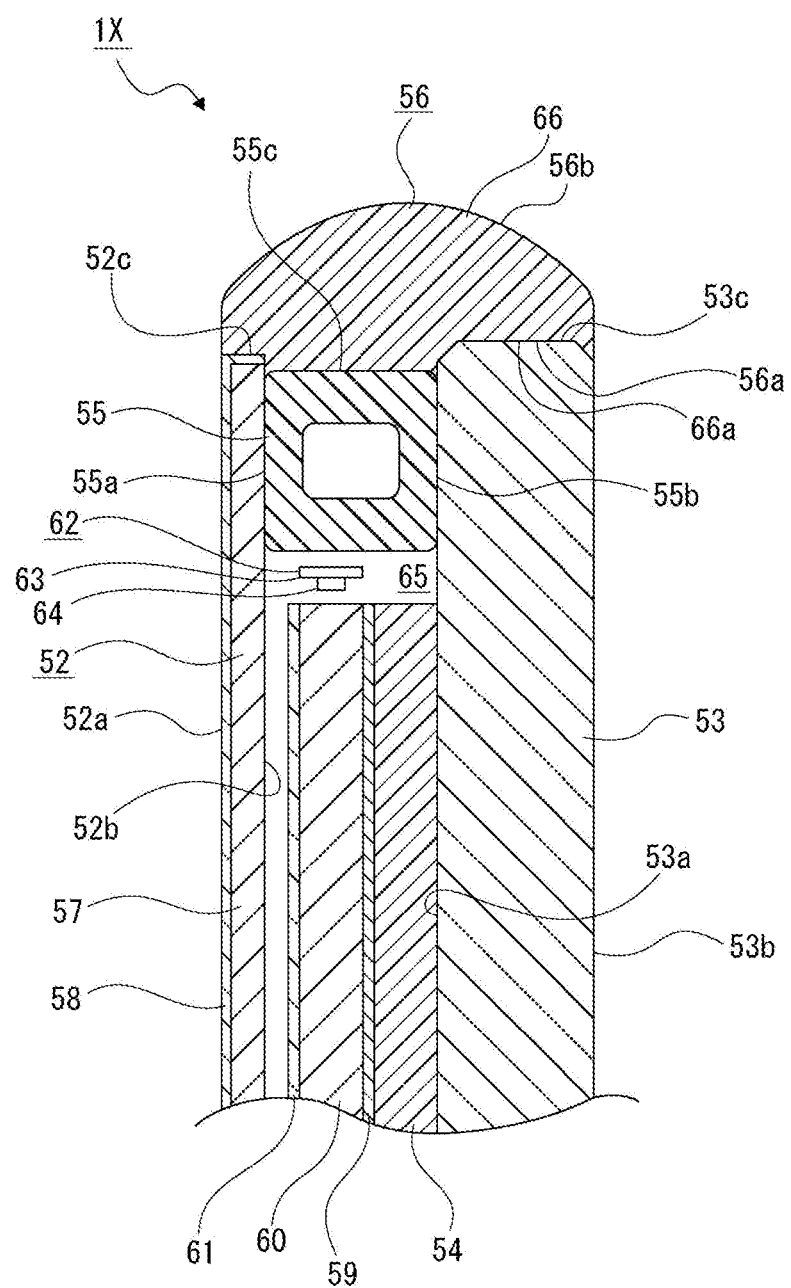
FIG. 14 is an enlarged cross-sectional view illustrating an example of a display apparatus having a liquid crystal display.

For example, the present technology is also applicable to a display apparatus 1X that uses a liquid crystal display described below (refer to FIG. 14).

For example, the display apparatus (television receiver) 1X includes a display 52, a back chassis 53, a heat radiation plate 54, a sealing body 55, and an outer frame 56. The display 52 is formed in a substantially rectangular shape that is horizontally long and whose thickness along the front-rear direction is thin, and displays an image. The back chassis 53 is disposed behind the display 52. The heat radiation plate 54 is internally disposed. The sealing body 55 is positioned on an outer periphery side of the radiation plate 54. The outer frame 56 is disposed on an outer periphery side of the display 52 and the back chassis 53.

The display 52 is the liquid crystal display, and is formed in a plate shape directed along the front-rear direction. The display 52 includes a substrate 57 and a polarization film 58 stuck on a front surface and an outer peripheral surface of the substrate 57. A front surface of the display 52 serves as a display surface 52a on which an image is displayed.

For example, the back chassis 53 includes glass and has an outer shape formed in a flat-plate shape having a substantially the same size as that of the display 52. A flat-shaped glass is used as the back chassis 53, thereby securing increased strength even in a case where the back chassis 53 is made thin. This can achieve improvement of strength of the display apparatus 1X and thinning of the display apparatus 1X.

Note that the glass scattering prevention film may be stuck on a rear surface of the back chassis 53, for example.

An outer shape of the heat radiation plate 54 is made smaller than that of the display 52. The heat radiation plate 54 is disposed between the display 52 and the back chassis 53, and is attached to a portion in a front surface 53a of the back chassis 53 excluding an outer periphery portion, for example. The heat radiation plate 54 includes, for example, a metal material such as aluminum, and has a function for dissipating heat generated in the display 52.

A reflection plate 59 is attached to a front surface of the heat radiation plate 54.

A light-guiding plate 60 is disposed between the back chassis 53 and the display 52. The light-guiding plate 60 includes a resin material such as acrylic or a glass material. The reflection plate 59 is attached to a rear surface of the light-guiding plate 60.

An optical sheet 61 is stuck on a front surface of the light-guiding plate 60. The optical sheet 61 is configured with various kinds of functional sheets laminated along the front-rear direction. The optical sheet 61 is configured with, for example, a polarizable sheet, a prism sheet, a diffusion sheet, and a reflection sheet, which are laminated.

A light source unit 62 is disposed on an outer periphery side of the light-guiding plate 60. The light source unit 62 includes control substrates 63, 63, . . . disposed along an outer peripheral surface of the light-guiding plate 60, and backlight light sources 64, 64, . . . mounted on the control substrates 63, 63, . . . while being separated from each other along a longitudinal direction of the control substrates 63, 63, . . .

The control substrates 63, 63, . . . are attached to a not-illustrated bracket fixed to, for example, the back chassis 53. The backlight light sources 64, 64, . . . are positioned between the control substrates 63 and the outer peripheral surface of the light-guiding plate 60. For example, light emitting diodes (LEDs) are used as the backlight light sources 64.

An outer shape of the sealing body 55 is made substantially the same as that of the display 52, and an inner shape of the sealing body 55 is made slightly larger than the heat radiation plate 54. The sealing body 55 includes an elastic material, for example, silicon. An outer peripheral portion in a rear surface 52b of the display 52 is pressed against a front surface 55a of the sealing body 55. The display 52 is brought into close contact with the sealing body 55 in a separable state. A rear surface 55b of the sealing body 55 is attached to an outer peripheral portion in the front surface 53a of the back chassis 53. The outer peripheral portion of the display 52 is pressed against the sealing body 55, so that the sealing body 55 is elastically deformed.

As described above, the sealing body 55 formed in the frame shape is attached to the outer peripheral portion of the back chassis 53, and the outer peripheral portion of the display 52 is pressed against the front surface 55a of the sealing body 55. This causes the sealing body 55 to seal a space 65 between the display 52 and the back chassis 53.

The outer frame 56 is provided as a resin portion 66 entirely including a resin material, for example. An inner surface 56a of the outer frame 56 is brought into close contact with an outer peripheral surface 52c of the display 52, an outer peripheral surface 53c of the back chassis 53, and an outer peripheral surface 55c of the sealing body 55. Accordingly, in the outer frame 56, an inner peripheral surface 66a of the resin portion 66 is brought into close contact with the outer peripheral surface 52c, the outer peripheral surface 53c, and the outer peripheral surface 55c. An outer peripheral surface 56b of the outer frame 56 is formed in a curved surface shape projecting outward, for example.

For example, the outer frame 56 is formed such that a base material having fluidity is filled on an outer periphery side of the display 52, the back chassis 53, and the sealing body 55, and after the base material is cooled and solidified, the base material is processed in a predetermined shape by cutting. As described above, the outer frame 56 is filled with the base material having fluidity, and therefore the inner peripheral surface 56a is formed in a shape following the outer peripheral surface 52c of the display 52, the outer peripheral surface 53c of the back chassis 53, and the outer peripheral surface 55c of the sealing body 55. Therefore, the inner peripheral surface 56a is brought into close contact with the outer peripheral surface 52c of the display 52, the outer peripheral surface 53c of the back chassis 53, and the outer peripheral surface 55c of the sealing body 55.

Accordingly, in the display apparatus 1X, the inner peripheral surface 56a of the outer frame 56 is brought into close contact with the outer peripheral surface 52c of the display 52, thereby producing no gap between the outer frame 56 and the display 52. Further, the inner peripheral surface 56a of the outer frame 56 is brought into close contact with the outer peripheral surface 53c of the back chassis 53, thereby also producing no gap between the outer frame 56 and the back chassis 53.

In addition, in the display apparatus 1X, in a thickness direction (front-rear direction), a size (a width in the front-rear direction) of the outer frame 56 is made the same as a distance from the display surface 52a of the display 52 to the rear surface 53b of the back chassis 53.

In the display apparatus 1X, when an image or a video is displayed on the display surface 52a of the display 52, light is emitted from the backlight light sources 64, 64, . . . .

The light emitted from the backlight light sources 64, 64, . . . enters the light-guiding plate 60, and is guided through the inside of the light-guiding plate 60 to be emitted toward the front. At this time, a part of the light that has entered the light-guiding plate 60 is reflected by the reflection plate 59, and is emitted toward the front. The light emitted from the light-guiding plate 60 toward the front enters the display 52 as backlight while being controlled by the optical sheet 61.

As described above, in the display apparatus 1x, the outer frame 56 that includes the resin material and covers the display 52 and the back chassis 53 from an outer periphery side is provided, and the inner peripheral surface 56a of the resin portion 66 of the outer frame 56 is brought into close contact with the outer peripheral surface 52c of the display 52 and the outer peripheral surface 53c of the back chassis 53.

Accordingly, no gap is produced between the outer frame 56 and the display 52 and between the outer frame 56 and the back chassis 53 along the direction orthogonal to the thickness direction of the display 52. Therefore, foreign matters such as dust do not enter between the outer frame 56 and the display 52 and between the outer frame 56 and the back chassis 53. This can achieve improvement of quality.

In addition, no gap is produced between the outer frame 56 and the display 52 along the direction orthogonal to the thickness direction of the display 52, and the outer frame 56 can be made transparent or can be colorized in any color, thereby enhancing freedom of design. This can achieve improvement of the design property.

Furthermore, no gap is produced between the outer frame 56 and the display 52 and between the outer frame 56 and the back chassis 53 along the direction orthogonal to the thickness direction of the display 52, and the outer frame 56 is positioned on the outer periphery side of the display 52 and the back chassis 53, thereby preventing the display apparatus 1X from being increased in size along the thickness direction (front-rear direction) and the direction orthogonal to the thickness direction. This can achieve a reduction in size of the display apparatus 1X.

In addition, the outer frame 56 is positioned on the outer periphery side over entire peripheries of the display 52 and the back chassis 53 in a state where the outer frame 56 is brought into close contact with the display 52 and the back chassis 53. This can enhance rigidity of the display apparatus 1X so that the quality can be improved.

Note that, respective configurations in the first modification to the fourth modification can also be applied to the display apparatus 1X, similar to the above-described display apparatus 1.

<Present Technology>

The present technology can also adopt the following configurations.

(1)

A display apparatus including:

a display that displays an image on a display surface;

a back chassis disposed on a side, of the display, opposite to the display surface;

a sealing body disposed between the display and the back chassis; and an outer frame that is provided as a resin portion at least partly including a resin material, and covers the display and the back chassis from an outer periphery side, in which an inner peripheral surface of the resin portion is brought into close contact with an outer peripheral surface of the display and an outer peripheral surface of the back chassis.

(2)

The display apparatus according to the item (1), in which the sealing body is formed in a frame shape, and the sealing body seals a space between the display and the back chassis.

(3)

The display apparatus according to the item (1) or (2), in which an outer peripheral surface of the outer frame is formed in a curved surface shape projecting outward.

(4)

The display apparatus according to any one of the items (1) to (3), in which the outer frame is made transparent.

(5)

The display apparatus according to any one of the items (1) to (4), in which the outer frame is used as a light-guiding body that guides light.

(6)

The display apparatus according to the item (5), in which the outer frame is formed with a reflection surface that internally reflects light.

(7)

The display apparatus according to any one of the items (1) to (6), in which the outer frame is provided with an integrally-formed portion including a material different in composition or kind from the resin portion.

(8)

The display apparatus according to the item (7), in which rigidity of the integrally-formed portion is made higher than rigidity of the resin portion.

(9)

The display apparatus according to the item (7) or (8), in which an insert member having the integrally-formed portion is provided, and a continuous portion that is continuous to the integrally-formed portion and is positioned between the display and the back chassis is provided in the insert member.

(10)

The display apparatus according to the item (9), in which the continuous portion is fixed to the back chassis.

(11)

The display apparatus according to the item (9) or (10), in which the continuous portion is used as the sealing body.

(12)

The display apparatus according to any one of the items (9) to (11), in which the continuous portion is used as a light-guiding body that guides light.

(13)

The display apparatus according to any one of the items (9) to (12), in which a reflection surface that internally reflects light is formed in the continuous portion.

(14)

The display apparatus according to any one of the items (1) to (13), in which the back chassis is used as the light-guiding body that guides light.

REFERENCE SIGNS LIST

1 . . . Display apparatus, 2 . . . Display, 2a . . . Display surface, 2c . . . Outer peripheral surface, 3 . . . Back chassis, 3c . . . Outer peripheral surface, 5 . . . Sealing body, 6 . . . Outer frame, 6b . . . Outer peripheral surface, 12 . . . Space, 13 . . . Resin portion, 13a . . . Inner peripheral surface, 6A . . . Outer frame, 14 . . . Integrally-formed portion, 5B . . . Sealing body, 15 . . . Continuous portion, 16 . . . Insert member, 15B . . . Continuous portion, 16B . . . Insert member, 20 . . . Reflection surface, 13D . . . Resin portion, 6E . . . Outer frame, 13E . . . Resin portion, 14E . . . Integrally-formed portion, 15F . . . Continuous portion, 26 . . . Reflection surface, 16F . . . Insert member

The invention claimed is:

1. A method of forming a display apparatus comprising:
providing a display that displays an image on a display surface,
a back chassis disposed on a side, of the display, opposite to the display surface, and
a sealing body disposed between the display and the back chassis; and
forming an outer frame that covers the display and the back chassis from an outer periphery side, by a process comprising contacting the display and back chassis with a resin material while the resin material is in a fluid form and allowing the resin material in the fluid form to solidify to form a resin portion, such that an inner peripheral surface of the resin portion is brought into close contact with an outer peripheral surface of the display and an outer peripheral surface of the back chassis, and the sealing body is elastically deformed between the display and the back chassis,
wherein the outer frame is configured to receive and transmit infrared light from a remote controller, and
wherein the outer frame has a rear surface angled with respect to a plane of the back chassis such that transmitted infrared light is internally reflected alone a plane parallel to the back chassis toward a central region of the back chassis.

2. The method according to claim 1, wherein the sealing body is formed in a frame shape, and the sealing body seals a space between the display and the back chassis.

3. The method according to claim 1, wherein an outer peripheral surface of the outer frame is formed in a curved surface shape projecting outward.

4. The method according to claim 1, wherein the outer frame is made transparent.

5. The method according to claim 1, wherein the outer frame is used as a light-guiding body that guides light.

6. The method according to claim 5, wherein the outer frame is formed with a reflection surface that internally reflects light.

7. The method according to claim 1, wherein the outer frame is provided with an integrally-formed portion including a material different in composition or kind from the resin portion.

8. The method according to claim 7, wherein rigidity of the integrally-formed portion is made higher than rigidity of the resin portion.

9. The method according to claim 7, wherein an insert member having the integrally-formed portion is provided, and a continuous portion that is continuous to the integrally-formed portion and is positioned between the display and the back chassis is provided in the insert member.

10. The method according to claim 9, wherein the continuous portion is fixed to the back chassis.

11. The method according to claim 9, wherein the continuous portion is used as the sealing body.

12. The method according to claim 9, wherein the continuous portion is used as a light-guiding body that guides light.

13. The method according to claim 9, wherein a reflection surface is provided on the rear surface and internally reflects light and is formed in the continuous portion.

14. The method according to claim 1, wherein the back chassis is used as a light-guiding body that guides light.

15. A display apparatus comprising:
a display that displays an image on a display surface;
a back chassis disposed on a side, of the display, opposite to the display surface, and
a sealing body disposed between the display and the back chassis, the sealing body is elastically deformed;
a heat radiation plate between the display and the back chassis; and
an outer frame that covers the display and the back chassis from an outer periphery side,
wherein the display and back chassis are in contact with a resin material, the resin material once being in a fluid form and then solidified to form a resin portion, such that an inner peripheral surface of the resin portion is brought into close contact with an outer peripheral surface of the display and an outer peripheral surface of the back chassis,
wherein the outer frame is configured to receive and transmit infrared light from a remote controller, and
wherein the outer frame has a rear surface angled with respect to a plane of the back chassis such that transmitted infrared light is internally reflected alone a plane parallel to the back chassis toward a central region of the back chassis.

16. The display apparatus according to claim 15, wherein the sealing body is formed in a frame shape, and the sealing body seals a space between the display and the back chassis.

17. The display apparatus according to claim 15, wherein an outer peripheral surface of the outer frame is formed in a curved surface shape projecting outward.

18. The display apparatus according to claim 15, further comprising a scattering prevention film on a rear surface of the back chassis.

19. The display apparatus according to claim 15, wherein the outer frame is used as a light-guiding body that guides light.

20. The display apparatus according to claim 15, wherein the outer frame is formed with a reflection surface that internally reflects light.

* * * * *